United States Patent [19]

Russ et al.

[11] Patent Number: 4,592,779

[45] Date of Patent: Jun. 3, 1986

[54] METHOD FOR RECOVERING PRECIOUS METALS FROM PRECIOUS METAL-BEARING MATERIALS SUCH AS ORE AND TAILINGS

[76] Inventors: James J. Russ, P.O. Box 305, Lawrenceburg, Tenn. 38464; John W. Smith, 1550 W. Churchill, Germantown, Tenn. 38138

[21] Appl. No.: 588,093

[22] Filed: Mar. 9, 1984

[51] Int. Cl.⁴ .................... C22B 3/00; C22B 11/04
[52] U.S. Cl. ................ 75/101 R; 75/118 R; 75/121; 210/633; 423/22; 423/27
[58] Field of Search .............. 75/101 R, 105–107, 75/118 R, 121; 423/23, 23, 27, 29, 32, 33; 210/633

[56] References Cited

U.S. PATENT DOCUMENTS

| | | |
|---|---|---|
| 3,238,038 | 3/1966 | Hunter .......................... 75/118 R |
| 3,443,933 | 5/1969 | Boyan et al. ................... 75/118 R |
| 3,856,507 | 12/1974 | Brug et al. .................... 75/118 R |
| 3,885,955 | 5/1975 | Lutz et al. .................... 75/118 R |
| 3,920,789 | 11/1975 | Pittie et al. .................. 75/118 R |
| 3,969,244 | 7/1976 | Kobayashi et al. ............. 75/118 R |
| 4,039,327 | 8/1977 | Dietz, Jr. et al. .............. 75/118 R |
| 4,051,026 | 9/1977 | Cremers et al. ............... 75/118 R |
| 4,131,455 | 12/1978 | Edwards et al. ............... 75/118 R |
| 4,145,212 | 3/1979 | Bodson .......................... 75/118 R |
| 4,177,068 | 12/1979 | Balakrishnan et al. ......... 75/105 |
| 4,297,134 | 10/1981 | Yamada .......................... 75/118 R |
| 4,319,923 | 3/1982 | Falanga et al. ................. 75/118 R |
| 4,369,061 | 1/1983 | Kerley, Jr. ..................... 75/118 R |
| 4,421,724 | 12/1983 | Hunnel .......................... 75/118 R |
| 4,540,435 | 9/1985 | Miller et al. ................... 75/118 R |

*Primary Examiner*—John F. Niebling
*Assistant Examiner*—Terryence Chapman
*Attorney, Agent, or Firm*—Kendrick, Netter & Bennett

[57] ABSTRACT

A method for recovering precious metals such as gold and silver from precious metal-bearing materials that include other solids comprises treating the precious metal-bearing materials with an aqueous, basic solution having a pH in the range of about 12 to about 14 for a time sufficient to suspend the precious metals in substantially free form in the solution, followed by recovery of precious metals from solids and from the solution by known methods.

15 Claims, No Drawings

METHOD FOR RECOVERING PRECIOUS METALS FROM PRECIOUS METAL-BEARING MATERIALS SUCH AS ORE AND TAILINGS

This invention relates to a method for recovering such precious metals as gold, silver, palladium, platinum and rhodium from precious metal-bearing mixtures such as silver-containing and gold-containing ores and tailings.

Heretofore, methods for recovering precious metals from precious metal-bearing mixtures such as silver-containing and gold-containing ores commonly included the steps of crushing the ore, washing or frothing the crushed ore to eliminate clays and other contaminants, and then solubilizing the ore in an aqueous cyanide solution, an aqueous thiourea solution, an aqueous ammonium thiosulfate solution or aqua regia. Thereafter, these solubilized, precious metal-bearing solutions are treated for recovery of the precious metals by such techniques as carbon absorption, carbon-in-pulp absorption/desorption, amalgamation, ion exchange, electrowinning or precipitation. All of these methods depend upon availability of the precious metals in substantially free form in solution, for only the substantially free metals will be solubilized by such methods.

Despite the development of highly sophisticated crushing and milling techniques, much of the precious metals such as gold and silver in gold-bearing and silver-bearing ores fail to become sufficiently freed to be susceptible to solubilization. As a result, from 20% to 40% of the gold and silver in such ores escapes solubilization and goes unrecovered. Still other quantities of very fine precious metals, such as gold and silver, called flour gold and flour silver, are so fine that they escape solubilization and are discarded with the so-called waste which is also termed tailings.

This invention provides a process for recovering a higher percentage by weight of precious metals such as gold, silver, platinum, palladium and rhodium from precious metal-bearing materials, such as raw ores, crushed ores and tailings that have previously undergone treatment for precious metal removal with a thiourea or cyanide solution among others. The new process can also enhance recovery of each precious metal if two or more are present.

In the first step of the new process, the precious metal-bearing materials are treated with an aqueous basic solution having a pH in the range of about 12 to about 14 for a time sufficient to suspend the precious metal from the materials in substantially free form in the solution. The basic solution preferably contains an alkali metal or alkaline earth metal hydroxide, most preferably sodium hydroxide, and preferably has a concentration in the range of about 10% to about 15% by volume. The treatment preferably continues for a time in the range of about 20 minutes to about 40 minutes, depending upon the particle size, and the nature of the precious metal-bearing materials. These materials may be silicates, carbonates, sulfides, or some combination of two or more of these types. The temperature of the solution during the treatment is preferably in the range of about 60° C. to about 90° C., depending upon the particle size, and the nature of the precious metal-bearing materials.

After treatment with an aqueous basic solution, the suspended precious metals are separated from the aqueous solution by a conventional method such as carbon absorption, carbon-in-pulp absorption/desorption, amalgamation, ion exchange, electrowinning or precipitation. The remaining solids are treated, separately, for recovery of additional precious metals with an aqueous cyanide solution, an aqueous thiourea solution, an aqueous ammonium thiosulfate solution, or aqua regia.

The process of this invention not only increases the percentage by weight of precious metals such as gold and silver recovered from precious metal-bearing materials of many different kinds, but also reduces greatly the time required to achieve this result. For example, our two-step process requires as little as 40 to 80 minutes to effect gold or silver recovery. By contrast, conventional processes require several hours, or even days to complete.

The following examples demonstrate that the process of this invention effectively, even dramatically, increases substantially the quantity of gold recovered from a given quantity of gold-bearing materials such as gold-bearing ores and gold-bearing tailings.

EXAMPLES

We obtained gold-bearing tailings that had been discarded as so-called waste from the treatment of crushed, gold-bearing ores by the conventional cyanide or amalgamation methods. We analyzed the gold-bearing tailings before treatment according to this invention, and found that the tailings contained about 0.16 ounce to about 0.31 ounce of gold per ton.

We drew two separate samples of tailings from different parts of the same accumulation of so-called waste, and divided the first of these samples, called tailings No. 1, into three parts. We treated the first sample of tailings No. 1 with a 10% aqueous sodium hydroxide solution at a temperature of 90° C. for a time of 20 minutes and recovered 0.0006% by weight of gold, as determined by atomic absorption spectrophotometer.

We treated the second part of tailings No. 1 by the conventional cyanide leaching process, and obtained 0.0002% by weight of gold from this sample. Again, we used the atomic absorption spectrophotometer to make the measurement. The time required for this conventional process exceeded 40 hours.

We treated the third part of tailings No. 1 by the process of this invention. That is, we pretreated the third sample with a 10% aqueous sodium hydroxide bath for a period of 20 minutes, then treated the solids with an aqueous cyanide leaching solution, and obtained a total of 0.0008% by weight of gold. Total time elapsed for the two steps was about 80 minutes.

We treated the sample designated tailings No. 2 in the same way and obtained 0.0009% by weight of gold. As can be seen, the process of this invention increased the percentage of gold recovered from a given sample weight of gold-bearing tailings by a factor of up to 3, and reduced the time to completion by a factor of 20 or more.

We also obtained gold-bearing and silver-bearing concentrates from a domestic mine. The concentrates included about 0.5 ounce of gold per ton and about 20 ounces of silver per ton.

In similar fashion, we treated the liquid samples designated concentrate No. 1 and concentrate No. 2 by the same pretreatment and leaching steps, and obtained the results set forth in Table 1 below. Again, as with the tailings, the method of this invention more than doubled the quantity of gold recovered over the prior art technique, and reduced the time required for completion from 30–40 hours to 1–2 hours.

In these examples, we measured the quantity of gold recovered using atomic absorption methods employing a Perkin-Elmer digital computer against a Bureau of Mines standard employing a gold lamp. To confirm the validity of the data, we conducted mass spectrographic analyses of the concentrates, and found that the gold content of the concentrates was 0.48 to 0.52 troy ounce per ton for a good correlation to 0.5 ounce of gold per ton.

Significantly, the data from these examples prove that a substantial quantity of gold was freed in the basic pretreatment step, permitting 60% to 80% of the available gold to be recovered in the pretreatment step itself.

TABLE I

| Sample | Weight Percent | | |
|---|---|---|---|
| | Pretreat | Leach | Pretreat and Leach |
| Concentrate No. 1 | .0017 | .0008 | .0025 |
| Concentrate No. 2 | .0016 | .0006 | .0022 |

What is claimed is:

1. A method for recovering at least one precious metal from a mixture including said at least one precious metal comprising treating a mixture including at least one precious metal and other solids with a substantially cyanide ion-free aqueous basic solution having a pH in the range of about 12 to about 14 for a time sufficient to suspend said at least one precious metal in substantially free form in said solution, said time being at least about 20 minutes; separating the unsuspended, undissolved solids from said solution; and recovering said at least one suspended precious metal from the aqueous basic solution.

2. The method of claim 1 wherein said mixture includes flour gold and other inorganic solids.

3. The method of claim 1 wherein said mixture includes flour gold and other inorganic solids, and said flour gold constitutes about 20% to about 40% by weight of said mixture.

4. The method of claim 1 wherein said mixture includes particulate gold or silver and other particulate inorganic solids and wherein said mixture has been pretreated for removal of gold or silver with an aqueous thiourea solution, an aqueous cyanide solution, an ammonium thiosulfate solution, aqua regia, or by amalgamation.

5. The method of claim 4 wherein an aqueous cyanide solution is used for the pretreatment.

6. The method of claim 4 wherein an aqueous thiourea solution is used for said pretreatment.

7. The method of claim 1 wherein said aqueous basic solution includes sodium hydroxide in a concentration range of about 10% to about 15% by volume.

8. The method of claim 1 wherein said time is in the range of about 20 minutes to about 40 minutes.

9. The method of claim 1 wherein said aqueous basic solution is an aqueous sodium hydroxide solution.

10. The method of claim 1 further comprising recovering said precious metals from the separated solids.

11. The method of claim 10 further comprising recovering said precious metal from said separated solids by treatment with a thiourea solution, a cyanide solution, an ammonium thiosulfate solution, or aqua regia.

12. A method for recovering a precious metal from a mixture including said precious metal comprising treating a mixture including at least one of particulate gold, particulate silver, particulate platinum and particulate palladium and other particulate inorganic solids with a substantially cyanide ion-free aqueous basic solution having a pH in the range of about 12 to about 14 for a time of at least about 20 minutes to suspend said at least one of particulate gold, particulate silver, particulate platinum and particulate palladium in said solution; separating the unsuspended, undissolved solids from said solution; and recovering the suspended, said at least one of particulate gold, particulate silver, particulate platinum and particulate palladium from the aqueous basic solution.

13. The method of claim 12 further comprising recovering said at least one of particulate gold, particulate silver, particulate platinum and particulate palladium from the separated solids.

14. A method for recovering flour gold from a mixture including said flour gold comprising treating a mixture including flour gold in combination with other inorganic solids with a substantially cyanide ion-free aqueous basic solution having a pH in the range of about 12 to about 14 for a time of at least about 20 minutes to suspend said flour gold in said solution, separating the undissolved, unsuspended solids from said solution; and recovering said suspended flour gold from said solution, substantially free of particulate, inorganic solids.

15. The method of claim 14 further comprising recovering said flour gold from the separated solids.

* * * * *